United States Patent [19]

Marianowski et al.

[11] 4,247,604
[45] Jan. 27, 1981

[54] CARBONATE FUEL CELL ANODES

[75] Inventors: Leonard G. Marianowski, South Holland; Rafael A. Donado, Chicago, both of Ill.; Hansraj C. Maru, Brookfield Center, Conn.

[73] Assignee: Institute of Gas Technology, Chicago, Ill.

[21] Appl. No.: 962,017

[22] Filed: Nov. 20, 1978

[51] Int. Cl.³ .............................................. H01M 4/86
[52] U.S. Cl. ...................................... 429/40; 429/33; 33/46
[58] Field of Search ............................ 429/34, 40–45, 429/46, 30, 33; 75/171, 128 Z, 128 R

[56] References Cited

U.S. PATENT DOCUMENTS

| | | | |
|---|---|---|---|
| 2,047,916 | 7/1936 | Lohr | 75/128 Z |
| 3,297,489 | 1/1967 | Feng et al. | 429/40 |
| 3,826,686 | 7/1974 | Epstein et al. | 429/40 |
| 4,001,039 | 1/1977 | Elmore et al. | 429/40 X |
| 4,140,555 | 2/1979 | Garcia et al. | 75/171 X |

Primary Examiner—Charles F. Lefevour
Attorney, Agent, or Firm—Thomas W. Speckman

[57] ABSTRACT

A molten alkali metal carbonates fuel cell porous anode with a stabilizing agent to maintain porosity and surface area during fuel cell operation. A molten alkali carbonates fuel cell having the above stabilized anode and a method for production of such porous anodes.

33 Claims, 7 Drawing Figures

10μ

CARBONATE FUEL CELL ANODES

This invention relates to molten carbonate fuel cells and particularly to anodes in contact with alkali metal carbonates electrolytes over long periods of high temperature operation. The invention more specifically relates to carbonate fuel cell anodes principally of nickel or cobalt or mixtures thereof having added minor amounts of a stabilizing agent of chromium, aluminum or zirconium in oxide or alkali metal salt forms and mixtures thereof under cell operating conditions. It is preferred to use chromium. Additionally, it is preferable to use alumina as an effective dispersing agent in blending of the powders in the manufacture of the anodes of this invention.

Molten carbonate fuel cells generally comprise two electrodes with their current collectors, a cathode and an anode, an electrolyte tile making contact with both the electrodes and a cell housing to physically retain the cell components. Under fuel cell operating conditions, in the range of about 500° to about 700° C., the entire electrolyte tile, the carbonate and the inert support material, forms a paste and thus the electrolyte diaphragms of this type are known as paste electrolytes. The electrolyte is in direct contact with the electrodes where the three phase reactions (gas-electrolyte-electrode) take place. Hydrogen is consumed in the anode area producing water, carbon dioxide and electrons. The electrons flow to the cathode through an external circuit producing the desired current flow. At the anode there must be ready entry for the reactant gas, ready exit for the chemical reaction products and ready exit for the product electrons. To maintain a high level of stable performance, both electrolyte and electrode design and properties must be optimized and stabilized at the gas-electrolyte-electrode interface.

Improved molten carbonate fuel cell electrolytes are described in U.S. Pat. No. 4,079,171 and contain about 50 to 70 weight percent carbonates in a high surface area inert support portion. With the use of electrolytes such as described in the patent providing high power densities over long periods of time, the problem of loss of cell performance with time due to anode instability was recognized by the applicants.

Porous anodes of cobalt or nickel have been previously used in molten carbonate fuel cells. Porous anodes of this type can be produced by a variety of powder metallurgical techniques to form a green compact with voids between the particles forming interconnected pore channels throughout the compact. The green compact is then sintered by heating at temperatures of greater than about 70 percent of the melting point temperature. This produces anodes having pore channels throughout the structure. The loss of fuel cell power output of molten carbonate fuel cells after as short as a few hundred hours of use has been noted with porous cobalt and nickel anodes. The molten carbonate fuel cell power output loss appears to be related to the surface area loss of the porous anode. Thus, "stability" as referred to in this disclosure and claims relates to maintenance of fuel cell power output and anode surface area.

Various methods have been attempted to increase the porosity of electrode materials. One method has been to incorporate in the electrode material an alkali soluble material such as aluminum, silicon or boron which is dissolved out of the primary electrode material as taught by U.S. Pat. Nos. 3,359,099 and 3,414,438. However, such Raney-type electrodes produced according to these patents, while they have have greater initial porosity, have the same long term instability under molten carbonate fuel cell operation as normally produced porous nickel or cobalt anodes.

Other approaches have been attempted to produce high surface area electrodes for molten carbonate fuel cells such as electrodes having metal fiber wicks as described in U.S. Pat. No. 3,826,686.

It is known from teachings of general powder metallurgy to incorporate critical amounts of specific sized inert dispersoid particles in the base metal to produce porous sintered metal materials suitable for uses such as fluid flow distributors and filters as taught by U.S. Pat. No. 3,397,968. This patent teaches that sintered articles produced with the inert dispersoid particles are dimensionally stable with respect to overall shapes and sizes. Belgian Pat. No. 849,639 teaches use of conductive dispersoid particles of chromium, molybdenum, tungsten and mixtures thereof to produce thermally stable sintered porous metal structures for use as high temperature heating elements, conductive metallic grids, batteries and conductive elements for electrostatic precipitations. However, the teachings of these patents do not relate to fuel cell anode use and, particularly, they do not relate to surface area stability under carbonate fuel cell operating conditions. For example, combination of nickel with a dispersed phase of magnesium oxide or calcium oxide taught to produce overall dimensional stability by both the U.S. Pat. No. 3,397,968 patent and by the article "Sintering of Metal Powder Compacts Containing Ceramic Oxides", M. H. Tikkanen, B. O. Rosell and O. Wiberg, Powder Metallurgy, No. 10, pg. 49–60, (1962) does not result in suitable porous anode material providing surface area stability under carbonate fuel cell operating conditions to provide relatively constant power output of the fuel cell over periods of time in the order of several thousand hours.

It is an object of this invention to provide a molten alkali metal carbonates fuel cell having a stable anode providing high power densities necessary for practical fuel cell operation over long periods of time.

It is another object of this invention to provide improved molten alkali metal carbonates fuel cell porous anodes providing stability over long periods of time under fuel cell operating conditions.

It is yet another object of this invention to provide a method of production of porous anodes principally of nickel or cobalt or mixtures thereof which are stable over long periods of operation under molten carbonates fuel cell operating conditions.

Other objects and advantages of the invention will become apparent from the following description taken in conjunction with the accompanying drawings showing preferred embodiments wherein.

Molten alkali metal carbonates fuel cell porous anodes according to this invention comprise about 0.5 to about 20 weight percent, based upon the metal, of a stabilizing agent selected from the group consisting of chromium, zirconium and aluminum in metal, oxide or alkali metal salt forms and mixtures thereof, the remainder of the anode being substantially a metal selected from the group consisting of nickel, cobalt and mixtures thereof. It is especially preferred that the stabilizing agent be present in about 1 to about 10 weight percent, based upon the metal. The porous anodes of this invention are particularly suited for use in molten carbonate fuel cells of the type as described in U.S. Pat. No. 4,079,171. Such fuel cells have a binary or ternary electrolyte system of lithium and sodium or potassium carbonates and are suitable for use in conjunction with this invention. In these fuel cells under operating conditions, the alkali metal salts are predominately lithium chromite $LiCrO_2$; lithium aluminate $LiAlO_2$; and lithium zirconate $Li_2ZrO_3$.

The molten alkali metal carbonates fuel cell of this invention is the type having an anode and a cathode with their respective current collectors, an electrolyte tile making contact with said anode and cathode, and a cell housing to physically retain the cell components, the electrolyte tile comprising alkali metal carbonates and an inert support material which upon cell operation at temperatures of about 500° to about 700° C. forms a paste in direct contact with a porous anode. The improved fuel cell of this invention has a porous anode comprising about 0.5 to about 20 weight percent, based upon the metal, of a stabilizing agent selected from the group consisting of chromium, zirconium and aluminum in metal, oxide or alkali metal salt forms, and mixtures thereof with the remainder being substantially a metal selected from the group consisting of nickel, cobalt and mixtures thereof.

Under fuel cell operating conditions, the anode stabilizing agents of this invention will form oxides and in the alkali metal carbonates environment will form alkali metal salts. The lithium salt is preferentially formed. We have found that even though oxidation and alkali metal salt formation reactions take place, the stabilizing agents of this invention do not migrate from the anode. After long term cell operation, we have found over 90 weight percent of the stabilizing agents remaining in the anode. We have added the stabilizing agents to the anode in both the metal and the oxide forms. To reduce undesired active electrolyte carbonate loss during fuel cell operation, it is preferred to add the stabilizing agents in the lithium salt form or to react the stabilizing agents in the anode to form their lithium salt prior to cell operation.

Figure 1:
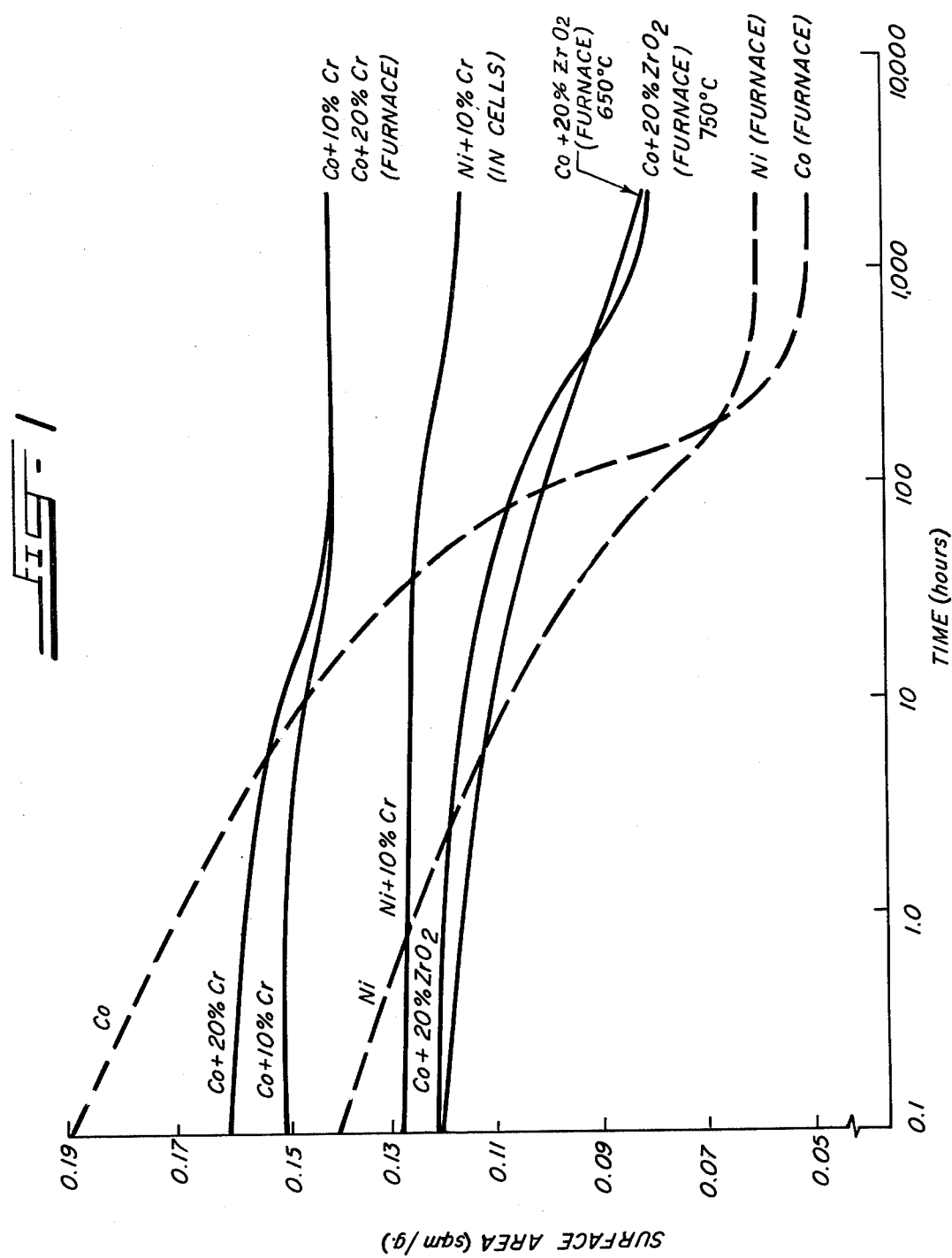
FIG. 1 is a graph showing comparisons of surface areas of preferred embodiments of fuel cell anodes of this invention with prior art fuel cell anodes at temperatures of molten carbonate fuel cell operation.

FIG. 1 shows changes in anode surface area as a function of time in accelerated furnace tests at 750° C. except for the one furnace test indicated at 650° C., in a fuel cell feed gas containing hydrogen, carbon dioxide, and water vapor. The results of one anode of 90 weight percent nickel—10 weight percent chromium according to this invention and operated in a molten carbonate fuel cell at 650° C. is also shown in FIG. 1. It is seen from FIG. 1 that the accelerated furnace tests do have validity with respect to surface area changes of the anode material as related to actual anode use in molten carbonates fuel cells. We have found in the fuel cell environment that the surface area change is somewhat retarded in time. FIG. 1 shows the surface area of conventional porous nickel and cobalt anodes by dashed lines. It is seen that in the conventional anodes without the stabilizing additives of this invention the surface area decreased in the order of a factor of 3 to 4. Both cobalt and nickel porous anodes containing chromium and zirconium stabilizing additives of this invention show very marked decrease in surface area change over the time interval shown.

Figure 2:
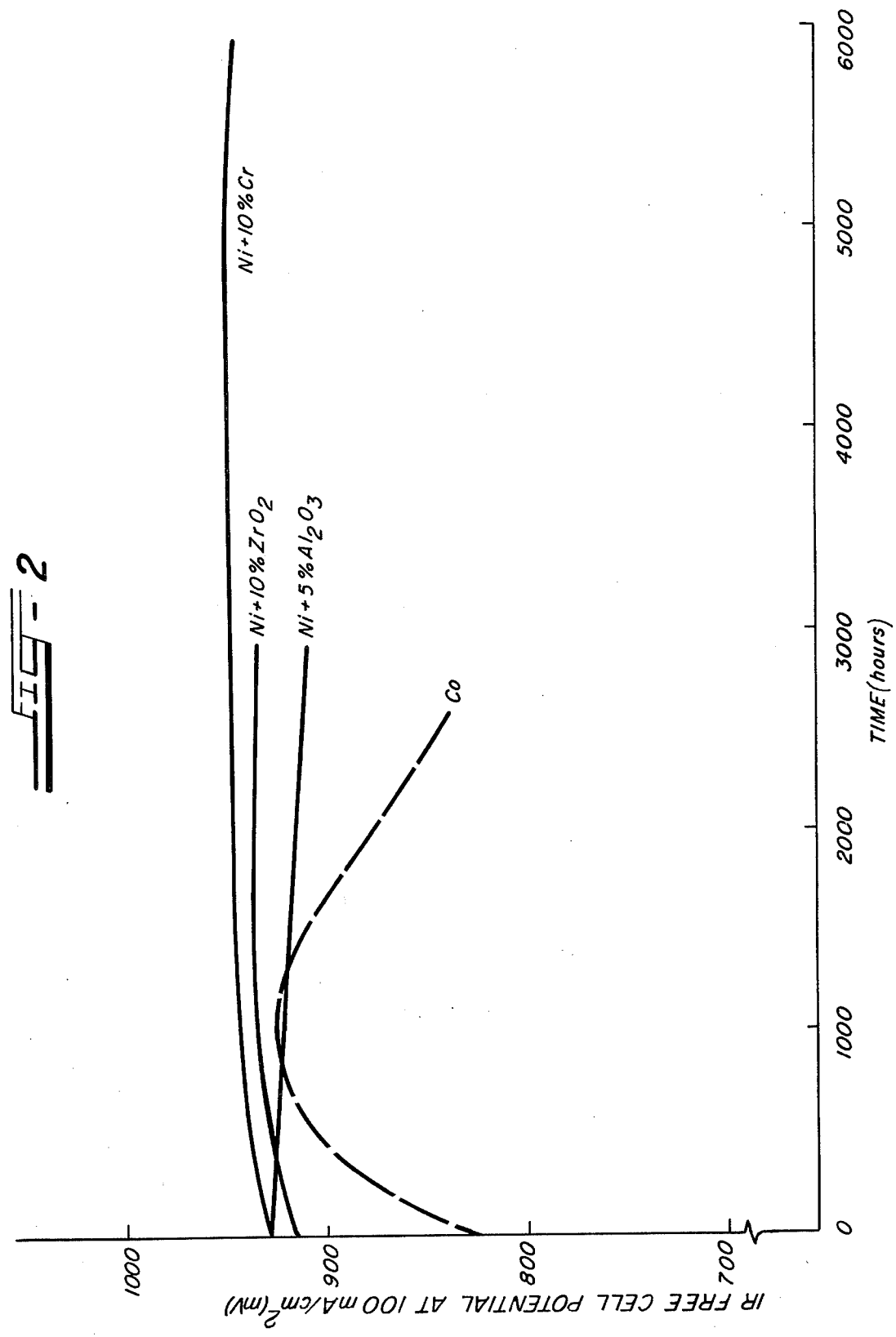
FIG. 2 is a graph showing comparison of molten carbonate fuel cell power densities using anodes of preferred embodiments of this invention compared with prior art fuel cell anodes.

FIG. 2 shows fuel cell power outputs versus time during cell operation at 650° C. with lithium carbonate/potassium carbonate binary eutectic electrolytes having a substantially lithium aluminate inert carrier structure and a nickel oxide cathode. The cells were comparable except for the anodes, the solid lines representing anodes of this invention and the dashed line a conventional cobalt porous anode. FIG. 2 shows the power output versus time with the various anodes. The curve for porous cobalt anodes without a stabilizing agent is the average of the operation of two cells; the curves representing the alumina and zirconia additives are each the average of two cells; and the curve representing the chromium additive is the average of three cells. The stabilized fuel cell power output obtained by use of anodes of this invention is clearly shown by FIG. 2.

Figure 3:
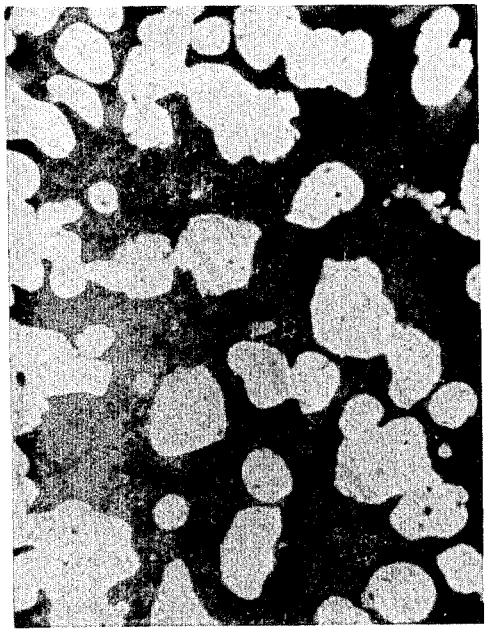
FIG. 3 is a photomicrograph of a 90% nickel—10% chromium anode according to one embodiment of this invention prior to fuel cell conditions.
Figure 4:
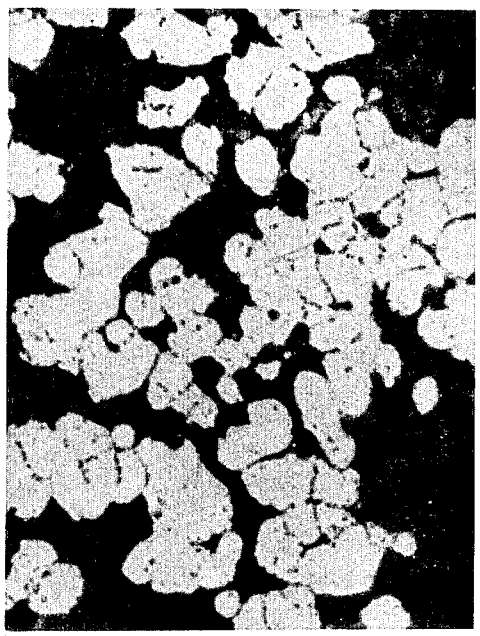
FIG. 4 is a photomicrograph of a 90% nickel—10% chromium anode according to the embodiment shown in FIG. 3 after 50 hours in a furnace in carbonates electrolyte environment at fuel cell operational temperature of 650° C.
Figure 5:
FIG. 5 is a photomicrograph of an anode according to the embodiment shown in FIG. 3 after 500 hours in a furnace in carbonates electrolyte environment at fuel cell operational temperature of 650° C.
Figure 6:
FIG. 6 is a photomicrograph of an anode according to the embodiment shown in FIG. 3 after 3000 hours in a furnace in carbonates electrolyte environment at fuel cell operational temperature of 650° C.

FIGS. 3 through 6 are photomicrographs showing the structural changes of an anode according to this invention having 10 weight percent chromium stabilizing agent and the remainder nickel. FIGS. 3 through 6 are the same magnification and the size indicator beneath FIG. 3 applies to all FIGS. 3–6. FIG. 3 shows the anode structure before subjecting the anode to heat and an electrolyte environment. FIGS. 4, 5 and 6 show the same anode material after 50 hours, 500 hours and 3000 hours, respectively, maintenance in a furnace at 650° C. in an electrolyte environment of $H_2$—$CO_2$—$H_2O$ fuel gas. FIGS. 3–6 show the lack of agglomeration and particle growth and illustrate the sequence of changes also observed in actual cell tests where only initial and final structures can be observed. The sequence shows the development of porosity or cavities in the nickel grains and confirm that fuel cell power output as shown in FIG. 2 correlates with surface area as shown in FIG. 1. FIGS. 3–6 show that the stabilized anodes of this invention maintain a high surface area under fuel cell operating conditions.

Figure 7:
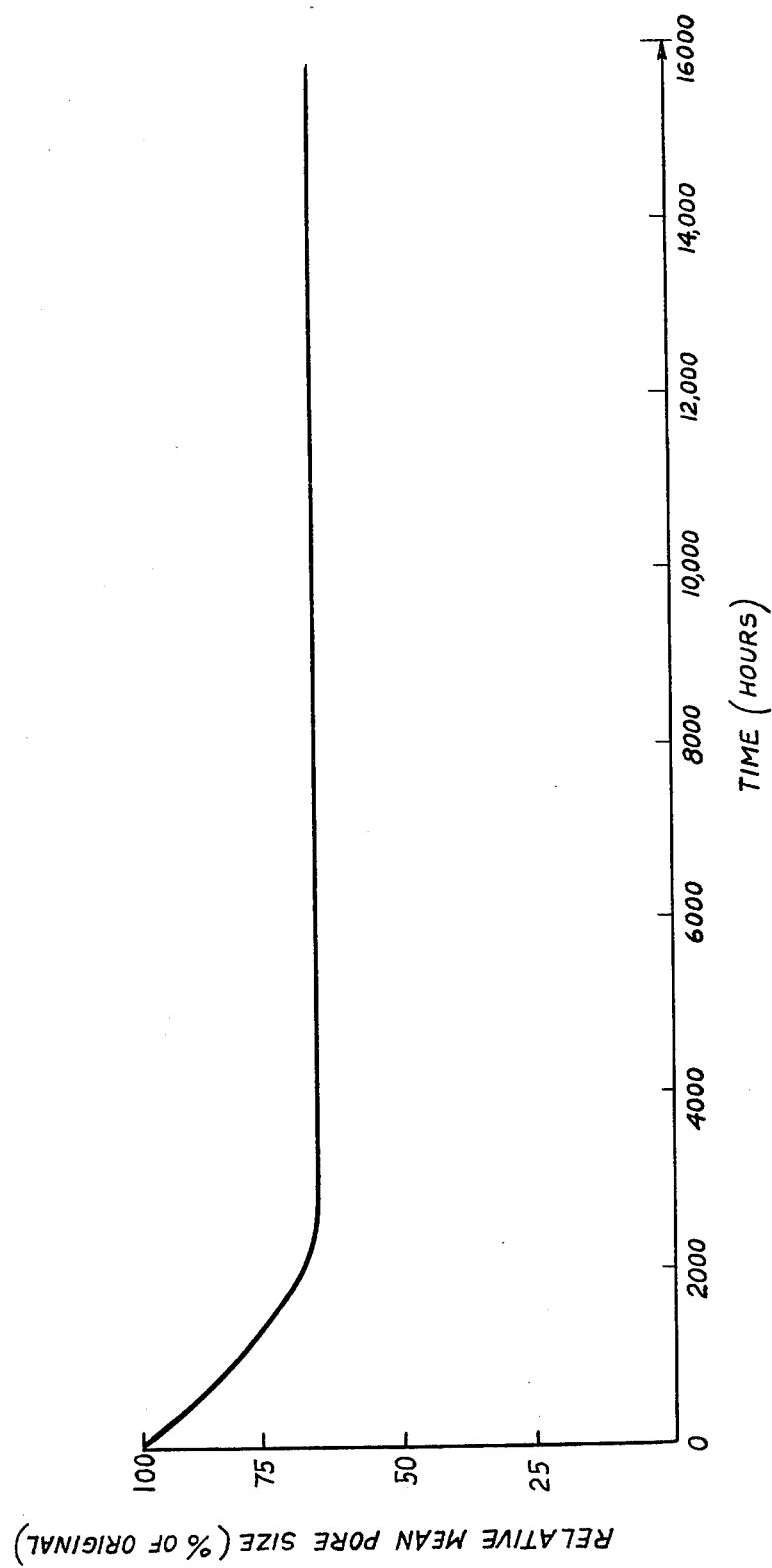
FIG. 7 is a graph showing mean pore size of a 90% nickel—10% chromium anode according to one embodiment of this invention during fuel cell operation.

It is also desired to obtain optimum porosity and pore size of the anode structure for long term high and stabilized power output of the fuel cell. We have found mean pore diameters of about 2 microns to about 20 microns to be suitable. Tests have shown that the mean pore size of a nickel—10 percent chromium stabilized anode according to this invention were reduced by about 33% after about 15,000 hours of cell operation. FIG. 7 shows results of these tests and the stability of mean pore diameter of an anode according to this invention during long term fuel cell operation.

We have found that about one-half of the total decay in cell power output in both 3 sq. centimeter cells and 100 sq. centimeter cells can be attributed to increases in ohmic losses which may be due to carbonate losses from the electrolyte caused by the lithium carbonate in the electrolyte reacting with the metal stabilizing agent in the anode to form lithium metal salt. Therefore, it is a preferred embodiment of this invention to react metal stabilizing agent with lithium carbonate prior to introduction into the anode material or prior to incorporation of the anode into a fuel cell.

The porous anodes of this invention may be prepared by mixing about 0.5 to about 20 weight percent, based upon the metal, of a stabilizing agent powder selected from the group consisting of chromium, zirconium and aluminum in metal, oxide or alkali metal salt form and mixtures thereof with the remainder being a metal powder having a size of about 0.1 to 200 microns selected from the group consisting of nickel, cobalt and mixtures thereof; pressing the mixture into a green compact with voids between the particles forming interconnected pore channels throughout the compact, the pore channels sized by the pressing to produce mean pore size of about 2 to about 20 microns in the sintered anode; and sintering the green compact at temperatures of greater than about 70 percent of the melting point of the metal powder. We have found that addition of about 0.5 to about 5 weight percent alumina powder to the powders provides dispersion of the stabilizing agent throughout the metal powder, resulting in a more uniform anode structure. The alumina powder should have a low bulk density and a high surface area. Degussa "C" alumina is appropriate.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A molten alkali metal carbonates fuel cell porous anode having mean pore diameters of about 2 to 20 microns and surface area about 0.09 to 0.16 square meters per gram having improved surface area stability under carbonate fuel cell operating conditions at about 500° to 700° C. comprising about 0.5 to about 20 weight percent, based upon the metal, of a surface area stabilizing agent selected from the group consisting of chromium, zirconium and aluminum in metal, oxide or alkali metal salt forms and mixtures thereof and the remainder being substantially a metal selected from the group consisting of nickel, cobalt and mixtures thereof.

2. The fuel cell anode of claim 1 wherein said stabilizing agent is present in about 1 to about 10 weight percent.

3. The fuel cell anode of claim 2 wherein said stabilizing agent metal is chromium.

4. The fuel cell anode of claim 3 wherein the chromium is substantially in the form of lithium chromite.

5. The fuel cell anode of claim 2 wherein said stabilizing agent metal is zirconium.

6. The fuel cell anode of claim 5 wherein the zirconium is substantially in the form of lithium zirconate.

7. The fuel cell anode of claim 2 wherein said stabilizing agent metal is aluminum.

8. The fuel cell anode of claim 7 wherein the aluminum is substantially in the form of lithium aluminate.

9. The fuel cell anode of claim 1 additionally having about 0.5 to about 5 weight percent alumina dispersing agent which is converted to alkali metal aluminate upon operation of the fuel cell.

10. The fuel cell anode of claim 9 wherein said stabilizing agent is present in about 1 to about 10 weight percent.

11. The fuel cell anode of claim 10 wherein said stabilizing agent metal is chromium.

12. The fuel cell anode of claim 11 wherein the chromium is substantially in the form of lithium chromite.

13. The fuel cell anode of claim 12 wherein the zirconium is substantially in the form of lithium zirconate.

14. The fuel cell anode of claim 10 wherein said stabilizing agent metal is zirconium.

15. The fuel cell anode of claim 1 wherein the surface area is maintained at about 0.09 to 0.15 square meters per gram after at least 1000 hours operation in a molten alkali metal carbonates fuel cell at about 650° to about 750° C.

16. In a molten alkali metal carbonates fuel cell of the type having an anode and a cathode with their respective current collectors, an electrolyte tile making contact with said anode and cathode, and a cell housing to physically retain the cell components, said electrolyte tile comprising alkali metal carbonates and an inert support material which upon cell operation at temperatures of about 500° to about 700° C. forms a paste in direct contact with a porous anode, the improvement of said porous anode having mean pore diameters of about 2 to 20 microns and surface area about 0.09 to 0.16 square meters per gram having improved surface area stability under carbonate fuel cell operating conditions comprising about 0.5 to about 20 weight percent, based upon the metal, of a surface area stabilizing agent selected from the group consisting of chromium, zirconium and aluminum in oxide or alkali metal salt forms and mixtures thereof under cell operating conditions and the remainder being substantially a metal selected from the group consisting of nickel, cobalt and mixtures thereof.

17. The molten alkali metal carbonates fuel cell of claim 16 wherein said alkali metal carbonates are selected from the group consisting of binary lithium and sodium carbonates and lithium and potassium carbonates and ternary lithium, sodium and potassium carbonates.

18. The molten alkali metal carbonates fuel cell of claim 17 wherein said stabilizing agent is present in about 1 to about 10 weight percent.

19. The molten alkali metal carbonates fuel cell of claim 18 wherein said stabilizing agent is chromium.

20. The molten alkali metal carbonates fuel cell of claim 19 wherein the chromium is substantially in the form of lithium chromite.

21. The molten alkali metal carbonates fuel cell of claim 18 wherein said stabilizing agent is zirconium.

22. The molten alkali metal carbonates fuel cell of claim 21 wherein the zirconium is substantially in the form of lithium zirconate.

23. The molten alakli metal carbonates fuel cell of claim 18 wherein said stabilizing agent is aluminum.

24. The molten alkali metal carbonates fuel cell of claim 23 wherein the aluminum is substantially in the form of lithium aluminate.

25. The molten alkali metal carbonates fuel cell of claim 18 wherein said stabilizing agent is zirconium.

26. The molten alkali metal carbonates fuel cell of claim 25 wherein the zirconium is in the form of lithium zirconate.

27. The molten alkali metal carbonates fuel cell of claim 17 additionally having about 0.5 to about 5 weight percent alumina dispersing agent which is converted to alkali metal aluminate upon operation of the fuel cell.

28. The molten alkali metal carbonates fuel cell of claim 27 wherein said stabilizing agent is present in about 1 to about 10 weight percent.

29. The molten alkali metal carbonates fuel cell of claim 28 wherein said stabilizing agent is chromium.

30. The molten alkali metal carbonates fuel cell of claim 29 wherein the chromium is in the form of lithium chromite.

31. The molten alkali metal carbonates fuel cell of claim 17 wherein over 90 weight percent of said stabilizing agent remains in said anode during long term cell operation.

32. The molten alkali metal carbonates fuel cell of claim 17 wherein said anode maintains a substantially constant surface area during long term cell operation.

33. The molten alkali metal carbonates fuel cell of claim 32 wherein the surface area is maintained at about 0.09 to 0.15 square meters per gram after at least 1000 hours at about 650° to about 750° C.

* * * * *

UNITED STATES PATENT AND TRADEMARK OFFICE
CERTIFICATE OF CORRECTION

PATENT NO. : 4,247,604
DATED : January 27, 1981
INVENTOR(S) : Leonard G. Marianowski, et al.

It is certified that error appears in the above-identified patent and that said Letters Patent are hereby corrected as shown below:

In Column 6, Line 18, delete "12" and insert --14--.

In Column 7, Line 5, delete "18" and insert --28--.

Signed and Sealed this

Eighteenth Day of August 1981

[SEAL]

Attest:

Attesting Officer

GERALD J. MOSSINGHOFF
Commissioner of Patents and Trademarks